United States Patent [19]

Colloton

[11] 3,762,233
[45] Oct. 2, 1973

[54] CLUTCH
[75] Inventor: Marcus J. Colloton, Cedarburg, Wis.
[73] Assignee: Simplicity Manufacturing Company, Inc., Port Washington, Wis.
[22] Filed: Mar. 3, 1972
[21] Appl. No.: 231,677

[52] U.S. Cl............................................ 74/242.14 R
[51] Int. Cl............................................. F16h 7/10
[58] Field of Search...................... 74/219, 242.14 R

[56] References Cited
UNITED STATES PATENTS
2,698,635  1/1955  Huddleston et al...... 74/242.14 R X
2,459,373  1/1949  Getty ...................... 74/242.14 R X Primary Examiner—Leonard H. Gerin
Attorney—Kenneth C. McKivett

[57] ABSTRACT

This disclosure comprehends an economical clutch for a main transmission drive usable in a lawn and garden tractor and this is accomplished by eliminating an idler pulley to control belt tension and providing a pivoted driven pulley which can be pivoted to interrupt the drive therefrom by misaligning its drive shaft through two flexible fiber glass disks.

4 Claims, 3 Drawing Figures

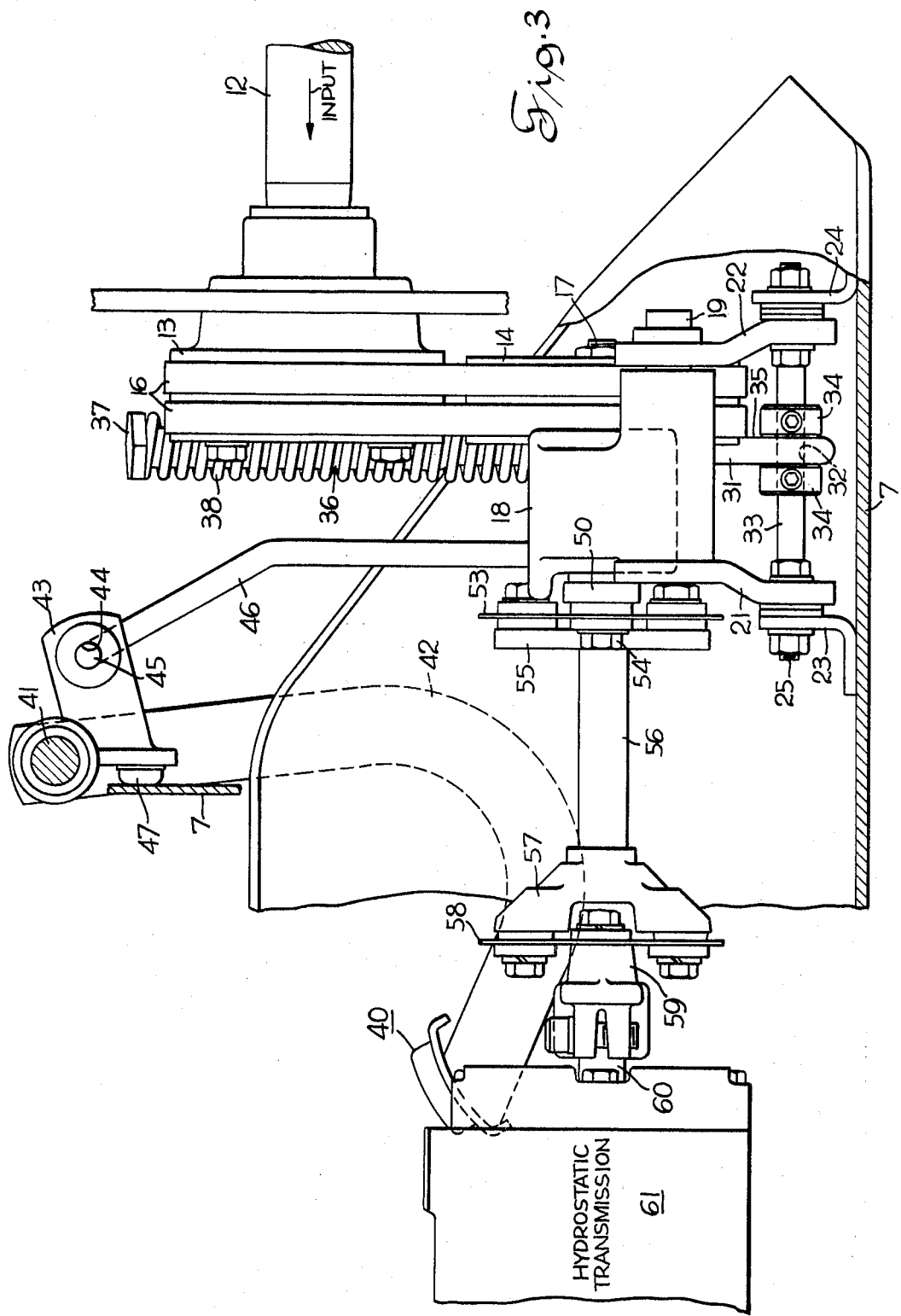

CLUTCH

The present invention relates generally to improvement in clutches particularly those clutches adapted to be used in lawn and garden tractors.

An object of this invention is to provide an economical belt drive clutching mechanism.

A further object of this invention is to provide an economical belt drive clutching mechanism which does not use a movable idler pulley.

A further object of this invention is to provide a belt drive clutching mechanism wherein the belt life is extended because the belt extends only from a drive pulley to a driven pulley without any intervening idler pulley.

In the drawings:

FIG. 3 is an enlarged view of a portion of FIG. 1 with some parts removed for clarity of illustration.

Figure 1:
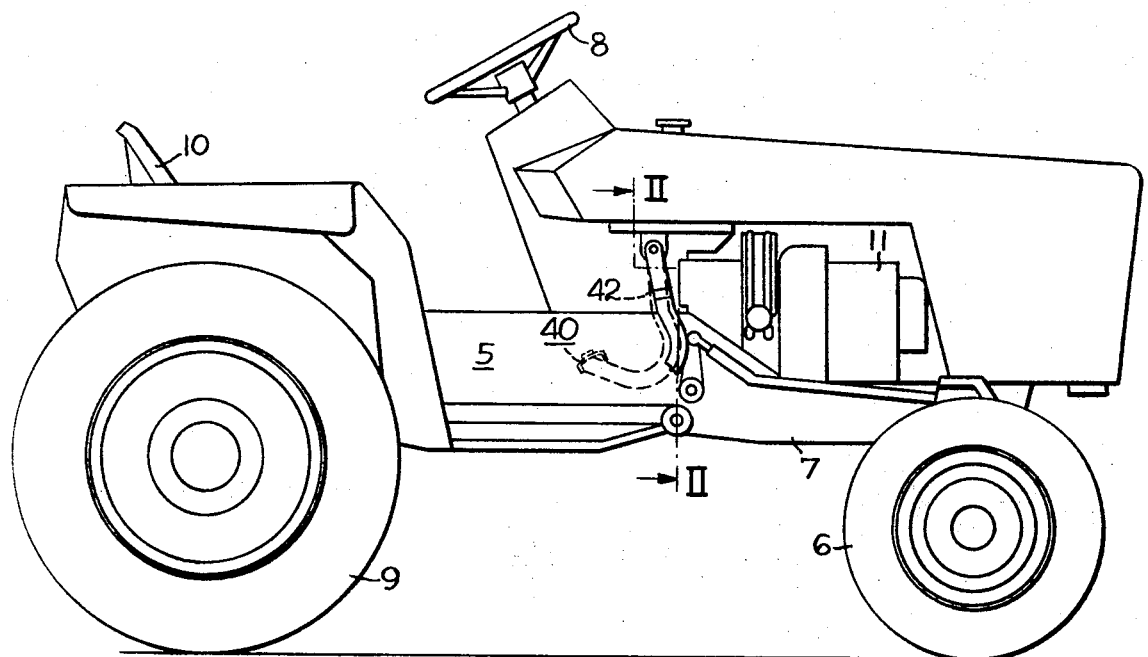
FIG. 1 is a side elevation of a garden tractor embodying the invention.

Referring now to the drawings, FIG. 1 shows a tractor 5 including dirigible front wheels 6 operatively mounted from a frame 7 and connected to steering wheel 8 by conventional means (not shown). A pair of transversely spaced rear wheels 9 are connected to frame 7 in supporting relation thereto. An operator's seat 10 is supported on a rearward portion of frame 7 and an engine 11 is mounted on a forward portion of frame 7. Drive or input shaft 12 (see FIG. 3) of engine 11 has a double drive sheave 13 attached thereto for rotation therewith. Double sheave 13 is drivingly connected to double sheave 14 by means of belts 16. Double sheave 14 is keyed to one end of shaft 17 which is journaled in bearing assembly 18. At one transverse end, bearing assembly 18 is pivotally mounted on longitudinally extending stub shaft 19. A pair of longitudinally spaced support arms 21 and 22 support opposite ends of stub shaft 19. Support arms 21 and 22 in turn are supported from frame 7 by means of transversely extending angle irons 23 and 24, respectively, to which they are bolted by means of nut and bolt assemblies 25.

Figure 2:
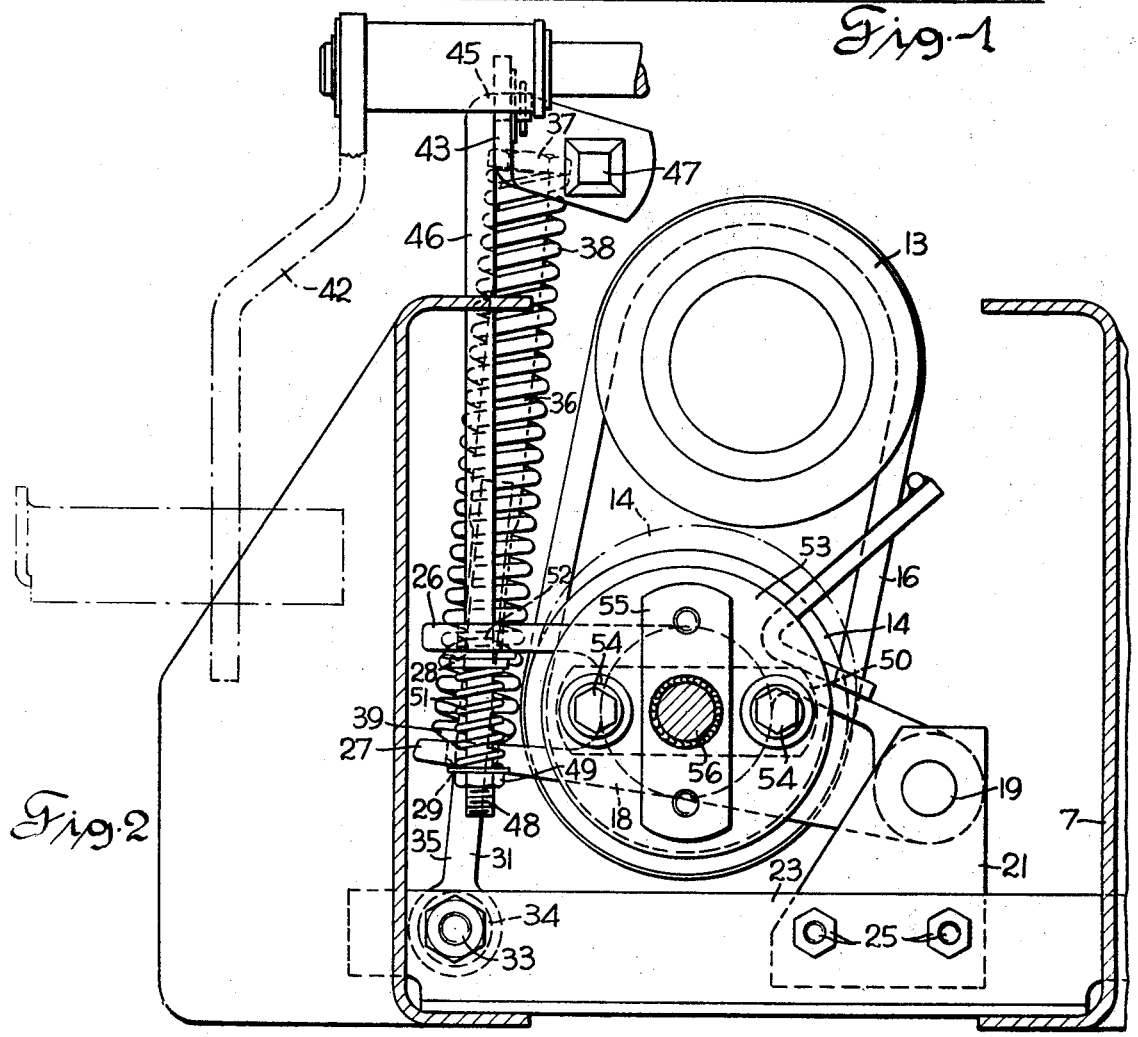
FIG. 2 is an enlarged view taken on line II—II of FIG. 1.

The other transverse end of bearing assembly 18 (see FIG. 2) is bifurcated into portions 26 and 27 which are transversely and vertically spaced apart, and which portions are provided with openings 28 and 29, therethrough, respectively. A reaction rod 31 is provided with an enlarged lower end having an opening therein which pivotally receives a roll 33 carried by transversely extending angle irons 23 and 24. A pair of collars 34 mounted on rod 33 retain reaction rod therebetween on rod 33. Reaction rod 31 is made up of two parts 35 and 36 which are threadably engaged so that rod 31 can be made longer or shorter as by rotating upper portion 36 relative to lower portion 35. Upper portion 36 is provided with a hexagonal head 37 for making such adjustment easy. The lower portion 35 of rod 31 passes through hole 29 in bifurcated portion 27. A compression spring 38 is positioned about reaction rod 31 between hexagonal head 37 and bifurcated portion 27 so that as rod 31 is shortened by turning portion 36 relative to 35, spring 38 is compressed and tends to move bearing assembly 18 counterclockwise about shaft 19 as viewed in FIG. 2. Such counterclockwise movement is resisted by belts 16 tightening up around sheaves 14. A spacer pad 39 is positioned between member 27 and the lower end of spring 38.

Referring to FIG. 3, a foot pedal assembly 40 is pivotally mounted for movement about a transverse pivot pin bell crank lever having arms 42 and 43. Arm 43 is provided with a hole 44 therethrough which receives the upper turned over portion 45 of a rod 46. Arm 43 is also provided with a stop portion 47 which limits clockwise movement of assembly 40 about pivot pin 41. Stop portion 47 contacts frame 7 thereby limiting further movement of assembly 40. This rod 46 passes through opening 28 (see FIG. 2) in bifurcated member 26 and terminates in a threaded lower end portion 48 upon which adjustment nut 49 is threadably engaged. A spring 51 is mounted about rod 46 between bifurcated member 26 and nut 49. A spacer pad 52 is positioned between member 26 and the upper end of spring 51.

Referring to FIG. 3 double sheave 14 is attached to one end of shaft 17 and the other end of shaft 17 is attached to a yoke 50 which in turn is attached to a fibre disk 53 by means of bolts 54. A second yoke 55 is attached to fibre disk 53 at one end and yoke 55 is attached at its other end to one end of shaft 56 which has its other end attached to yoke 57. Yoke 57 is attached to a second fibre disk 58. A yoke 59 connects fibre disk 58 with drive shaft 60 connected to a fixed position hydrostatic transmission 61 for driving same.

The operation of this clutch mechanism is as follows:

Referring to FIG. 3 engine 11 is turning input shaft 12 which in turn drives dual pulley 13. Pulley 13 drives pulley 14 through the medium of belts 16. Pulleys 14 drive shaft 17 which drives yoke 50 and disk 53 connected thereto. Disk 53 drives yoke 55 and shaft 56 connected thereto. Shaft 56 drives yoke 57 and disk 58 which is connected thereto and disk 58 drives yoke 59 and shaft 60 connected thereto. Shaft 60 drives hydrostatic transmission 61. Now assume that the operator wishes to declutch engine 11 from hydraulic transmission 61, he would depress lever assembly 40 which in turn would raise arm 43 and rod 46. As rod 46 is raised, spring 51 is compressed against bifurcated member 26 and spring 38 is compressed against bifurcated member 27 until bearing assembly 18 pivots clockwise about shaft 19 moving sheaves 14 out of contact with belts 16 and thus interrupting the drive.

As sheave 14 moves out of contact with belt 16 the misalignment of shaft 17 relative to shaft 60 is absorbed by fibre disks 53 and 58 which are so mounted on their yokes as to function much the same as universal joints and the axes of shafts 17 and 12 always remain parallel. To re-establish a driving connection between engine 11 and hydraulic transmission 61 all that need be done is for the operator to take his foot off of foot pedal assembly 40 thus permitting springs 38 and 51 to return bearing assembly 18 to the driving position shown in FIG. 2.

It should be noted that no idler pulley is utilized in this combination and, accordingly, the belts 16 do not suffer the deformation caused by conventional idler pulley belt tightness.

The embodiments of the invention in which an exclusive property or privilege is claimed are defined as follows:

1. A belt drive transmission having a frame and in combination a fixed driving shaft mounted on said frame and a driven shaft, each of said shafts carrying a V-belt drive pulley, a V-belt encircling said drive pulleys, control means for moving the said driven shaft to tighten said belt and thereby effecting a driving connection between said shats, for moving said driven shaft to loosen said belt so that the driving connection between said shafts is inoperative, a fixed position driven mechanism connected to said driven shaft for operation thereby, the longitudinal axes of said driving and driven shafts remaining substantially parallel at all times, means for absorbing misalignment between said fixed position driven mechanism and said driven shaft when said driven shaft is moved to loosen said belt, said control means comprising springs carried by said frame for normally biasing said driven shaft away from said driving shaft for effecting said driving connection by tightening said belt, and a foot pedal assembly carried by said frame and connected to said springs so that upon actuation of said foot pedal said springs bias said driven sheave to inoperative position.

2. A belt drive transmission as recited in claim 1 and wherein said foot pedal assembly is provided with a depending portion which contacts said frame when said driven sheave has returned to operative position.

3. A belt drive transmission as recited in claim 1 and wherein said means for absorbing misalignment comprises a universal joint type structure operatively connecting said driven shaft with said fixed position driven mechanism.

4. A belt drive transmission as recited in claim 3 and wherein said universal type structure includes a pair of fibre disks disposed between said driven shaft and said fixed position driven mechanism for absorbing said misalignment.

* * * * *